E. G. MUELLER.
WELDING TORCH.
APPLICATION FILED JAN. 30, 1913.
1,105,290.
Patented July 28, 1914.
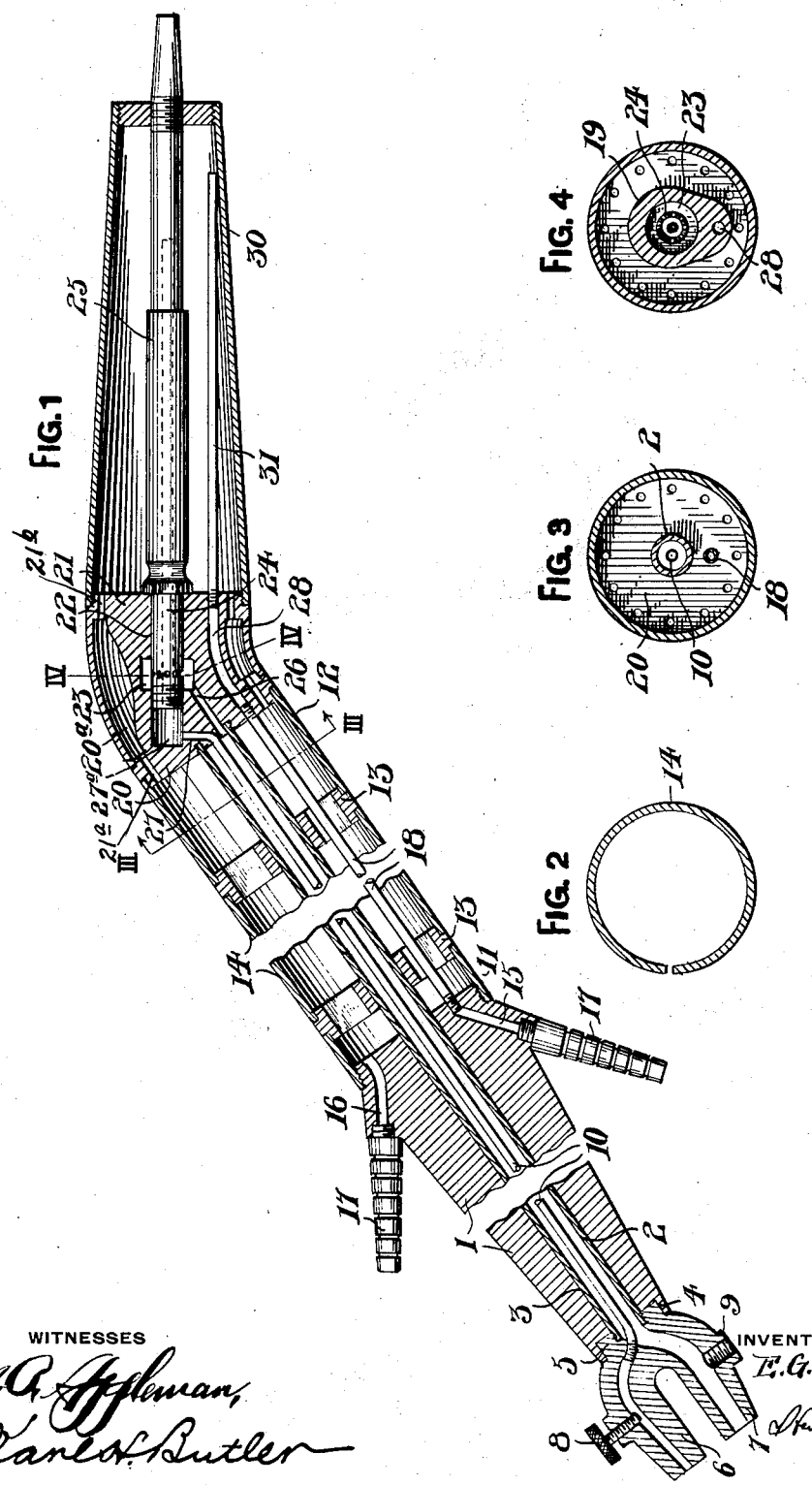
WITNESSES
INVENTOR
E. G. Mueller.
ATTORNEY

UNITED STATES PATENT OFFICE.

EDWARD G. MUELLER, OF PITTSBURGH, PENNSYLVANIA.

WELDING-TORCH.

1,105,290.　　　　　Specification of Letters Patent.　　Patented July 28, 1914.

Application filed January 30, 1913. Serial No. 745,162.

*To all whom it may concern:*

Be it known that I, EDWARD G. MUELLER, a citizen of the United States of America, residing at Pittsburgh, in the county of Allegheny and State of Pennsylvania, have invented certain new and useful Improvements in Welding-Torches, of which the following is a specification, reference being had therein to the accompanying drawing.

This invention relates to a welding torch, and the primary object of my invention is to provide a torch, wherein positive and reliable means are employed, as hereinafter set forth, for cooling the burner body and handle of a torch in order that the torch can be safely manipulated without subjecting it to a high temperature, which is often necessary when welding large and intricate pieces of work.

Another object of this invention is to provide a welding torch having a hollow handle and a burner casing through which there is circulated water or a cooling agent that prevents the parts of the torch from being distorted due to excessive heat.

A further object of this invention is to provide an elongated welding torch embodying a coupling member, a hollow handle, an elbow and a burner casing, all of which are compactly arranged for the mixing of oxygen and acetylene and the circulation of a cooling agent which renders the torch highly efficient for the purposes for which it is intended.

A still further object of this invention is to provide a torch of the above type consisting of comparatively few parts that can be easily and quickly assembled, manufactured at a comparatively small cost and conveniently used when a high temperature is to be obtained for welding purposes.

With the above and other objects in view the invention resides in the novel construction, combination and arrangement of parts to be hereinafter specifically described and then claimed.

Reference will now be had to the drawing, wherein:—

Figure 1 is a longitudinal sectional view of the torch partly broken away, Fig. 2 is a cross sectional view of a connecting sleeve forming part of the hollow handle of the torch, Fig. 3 is a cross sectional view taken on the line III—III of Fig. 1, and Fig. 4 is a similar view taken on the line IV—IV of Fig. 1.

A torch in accordance with this invention comprises a tapering coupling member 1 that is provided with a longitudinal bore 2 through which extends an acetylene feed pipe 3. The inner end of the coupling member 1 has an annular recess 4 to receive the reduced end 5 of a double inlet nipple, comprising nipples 6 and 7. The nipple 6 constitutes an inlet for oxygen and said nipple has a regulating valve 8. The nipple 7 constitutes an inlet for acetylene gas and provision is made, as at 9 for a regulating valve. The nipple 7 is in communication with the acetylene feed pipe 3 and the nipple 6 is connected to an oxygen feed tube 10 that extends throughout the length of the acetylene feed pipe 3.

Suitably connected to the outer end of the coupling member 1 is a sectional hollow handle, comprising tubular shells 11 and 12 provided with spaced coupling heads 13 that are in the form of a spider for holding the acetylene feed pipe concentric of the shells 11 and 12. The heads 13 are connected together by a split sleeve 14 and this sleeve, together with the shells 11 and 12 can be made of various lengths.

The coupling member 1, at the outer end thereof is provided with an angularly disposed water inlet port 15, and an angularly disposed water outlet port 16. These ports have communicating nipples whereby connections can be made with a suitable supply of water and a drain therefor. The outlet port 16 is in communication with the hollow handle and connected to the port 15 is a water tube 18 that extends throughout the length of the hollow handle of the torch.

Arranged at the outer end of the hollow handle is an elbow 19 having heads 20 and 21, the former being mounted in the hollow handle shell 12. The elbow has a chamber 20ª and is further provided with a cylindrical recess 22 extending through the head 21 to a point in proximity to the head 20, and the walls of this recess have an annular groove 23 in communication with the inner end 24 of a burner 25. The chamber 20ª is arranged between the heads 20 and 21, the former being provided with openings 21ᵃ for establishing communication between the hollow handle and the chamber 20ᵃ. The head 21 is formed with openings 21ᵇ for establishing communication between the casing 30, to be presently referred to, and the chamber 20ᵃ. The burner 25 and the mixer thereof are of the ordinary and well known type to which I lay no claim. The annular groove 23 is in communication with the oxygen tube 10 which communicates with a port 27 which opens into a cavity 27ᵃ in the head 20. The acetylene feed pipe 3 communicates with a duct 26 which opens into a groove 23 formed in the head 20 and arranged forwardly of the cavity 27ᵃ. The elbow 19 has another port 28 in communication with the water tube 18.

Mounted upon the head 21 of the elbow and inclosing the greater part of the burner 25 is a tapering casing 30 and extending into said casing and in communication with the port 28 is an outlet water tube 31 that extends in proximity to the outer closed end of the burner casing.

The mixing of oxygen and acetylene is accomplished at the inner end 24 of the burner 25, the supply of oxygen passing centrally of the supply of acetylene gas and both supplies are regulated at the inlet nipples. While the burner is in use the water is conveyed to the forward end of the burner casing and the return of the water to the port 16 cools the casing 30, the elbow 19 and the hollow handle, permitting of these parts being easily manipulated and safely used for welding purposes without any danger of the parts being disassembled or distorted due to the excessive heat to which they are subjected. The openings 21ᵇ allow of the cooling medium flowing back from the casing 30 into the chamber 20ᵃ for cooling the elbow and the openings 21ᵃ provide what may be termed discharge passages for the cooling medium from the chamber 20ᵃ into the handle.

The connections between the various parts of the torch can be accomplished by soldering, welding, screw threads or any other well known means, and the regulating valves used for controlling the admission of oxygen and acetylene to the torch are of the ordinary and well known type.

I attach considerable importance to the manner in which the water or cooling agent is supplied and conveyed through the torch to be discharged for circulation at a point where the torch is subjected to the highest temperature, and by making the hollow handle of a plurality of sections it is apparent that this handle can be made of any length that is necessary where special work is to be operated upon. The torch in its entirety can be made of light and durable material and while in the drawing there is illustrated a preferred embodiment of the invention, it is to be understood that the structural elements are susceptible to such variations and modifications as fall within the scope of the appended claims.

What I claim is:—

1. A welding torch comprising a hollow handle, a coupling member at one end thereof, an elbow at the opposite end of said handle, a burner carried by said elbow, a casing inclosing the greater part of said burner and in communication with said hollow handle through the medium of said elbow, means for establishing communication between said burner and said coupling member, and means independent of the last mentioned means for circulating a cooling agent throughout said handle and said casing.

2. A welding torch comprising a hollow handle, a coupling member carried by one end thereof, an elbow carried by the opposite end of said handle, a burner supported by said elbow, a casing carried by said elbow and inclosing the greater part of said burner, means arranged concentrically of said handle for establishing communication between said coupling member and said burner, and means extending longitudinally of said handle and said casing for circulating a cooling agent throughout said casing, around said elbow and throughout said handle.

3. A welding torch comprising an inclined hollow handle closed at each end, a burner connected to one end of said handle and disposed at an angle with respect to the latter, means for conducting the constituents of a combustible mixture through the handle to said burner, and means for circulating a cooling medium around said burner and discharging said medium back through said handle.

4. A welding torch comprising an inclined hollow handle closed at each end, a burner connected to one end of said handle and disposed at an angle with respect to the latter, means for conducting the constituents of a combustible mixture through said handle to said burner, a cooling medium conducting pipe extending into said hollow handle and supplying a cooling medium to cool said burner, means for discharging the cooling medium from around the burner back through said handle and an outlet for the cooling medium at the lower end of the handle.

5. A welding torch comprising a coupling member, a sectional hollow handle carried thereby, a burner supported at one end of said handle, means for conducting the constituents of a combustible mixture through said handle to said burner, and means for conducting a cooling medium through said handle and supplying the same to cool said burner, and means whereby said cooling medium is discharged back through said handle for cooling the means for conducting the constituents of the combustible mixture.

6. A welding torch comprising a hollow handle, a burner supported by and projecting from one end thereof, an inner and an outer pipe extending through said handle and communicating with said burner for supplying the constituents of a combustible mixture to the burner, each of said pipes independent of the other, and means for conducting a cooling medium to cool the burner and for discharging said cooling medium back through said handle thereby cooling said inner and outer pipes.

7. A welding torch comprising a hollow handle, a coupling member at one end thereof, a burner at the opposite end thereof, means extending through said coupling member and through said handle for supplying the constituents of a combustible mixture to said burner, a casing inclosing said burner and in communication with the interior of said handle, and means for conducting a cooling agent directly to said casing to cool said burner and for discharging said medium back through said handle.

8. A welding torch comprising a hollow handle, an elbow at one end thereof, a burner carried by the elbow, a casing inclosing said burner, means extending through said handle for establishing communication between said burner and supplies for the constituents of a combustible mixture, means for directly conducting a cooling medium to said casing to cool the burner, and said elbow provided with means for discharging the cooling medium from said casing and into the hollow handle, said handle having an outlet for the cooling medium.

9. A welding torch comprising a hollow sectional handle, a coupling member attached to one end of said handle, an elbow connected to the other end of said handle, a burner attached to the elbow, a casing attached to the elbow and surrounding the burner, means extending through said coupling member and handle and into the elbow for supplying the constituents of a combustible mixture to the burner, and means for conducting a cooling medium to said casing and discharging said medium back through said handle.

10. A welding torch comprising an inclined hollow handle, a burner connected therewith, a tapering casing surrounding and of less length than the length of said burner and having one end connected with said handle, means for closing the other end of the casing, means for conducting the constituents of a combustible mixture through said handle to said burner, means for supplying a cooling medium through said handle to said casing, means for discharging the cooling medium from said casing back into said handle, and an outlet for the cooling medium at the lower end of the handle.

11. A welding torch comprising a hollow handle, a burner connected therewith, a tapering casing surrounding and of less length than the length of said burner and having one end connected with said handle, means for closing the other end of the casing, means for conducting the constituents of a combustible mixture through said handle to said burner, means for supplying a cooling medium through said handle to said casing, means for discharging the cooling medium from said casing back into said handle, and means to provide an outlet for the discharge of the cooling medium from the handle.

12. A welding torch comprising a hollow handle, an elbow connected to one end of said handle and provided with a chamber, a burner connected to and projecting from said elbow, said elbow provided with means for supplying the consituents of a combustible mixture to said burner, a casing surrounding said burner and having one end connected to the elbow and its other end closed and connected to the burner, conducting pipes extending through said handle and communicating with said means in the elbow for feeding the constituents of a combustible mixture to said means, means extending through the handle for conducting a cooling medium to said casing, and said elbow provided with means for discharging said cooling medium into said chamber and further provided with means for discharging said cooling medium into said handle, said handle having an outlet for the cooling medium.

13. A welding torch comprising a hollow handle, an elbow connected to one end of the handle and provided with a chamber, a burner carried by the elbow, said elbow provided with a recess and groove communicating with said burner, a casing inclosing said burner, means extending through said handle and communicating with said recess and groove for supplying thereto the constituents of a combustible mixture, means for directly conducting a cooling medium to said casing to cool the burner, said elbow further provided with means for discharging the cooling medium from said casing into said chamber for cooling said elbow and said elbow further having means for discharging said cooling medium from said chamber into said handle, and said handle having an outlet for the cooling medium.

14. A welding torch comprising a handle, an elbow connected thereto, a burner carried by the elbow, said elbow having a chamber and further provided with means for supplying the constituents of a combustible mixture to the burner, a casing inclosing said burner, said elbow provided with means for supplying a cooling medium to said casing and further provided with means for exhausting said cooling medium from said casing into said chamber and from said chamber.

15. A welding torch comprising a handle, an elbow connected thereto, a burner carried by the elbow, said elbow having means for supplying the constituents of a combustible mixture to said burner and further having a chamber surrounding said means, a casing inclosing said burner, and said elbow further provided with means for supplying a cooling medium to said casing and further provided with means for exhausting said cooling medium from said casing into said chamber and from said chamber into said handle, said handle having an outlet for said cooling medium.

16. A welding torch comprising a burner, a handle, means extending through the handle and engaging with the burner for supplying constituents of a combustible mixture thereto, a casing surrounding the burner, means for supplying a cooling medium to said casing to cool the burner, and means for discharging the cooling medium from the casing into the handle whereby said cooling medium is utilized to cool the constituents of the mixture while being supplied to the burner and further utilized for cooling the handle, said handle having an outlet for the cooling medium.

17. A welding torch comprising a burner, a pair of conduits for supplying the constituents of a combustible mixture to said burner, one of said conduits surrounding the other, a handle inclosing said conduits and connected with the burner, means for supplying a cooling medium to cool the burner, and means for supplying a cooling medium to said handle for cooling it and for further cooling the conduits.

In testimony whereof I affix my signature in the presence of two witnesses.

EDWARD G. MUELLER.

Witnesses:
   Max H. Srolovitz,
   Katherine Errett.